United States Patent
Sherrill et al.

(10) Patent No.: US 9,487,290 B2
(45) Date of Patent: Nov. 8, 2016

(54) COMPOSITE ROTOR BLADE HAVING WEIGHTED MATERIAL FOR MASS BALANCING

(75) Inventors: Paul B. Sherrill, Grapevine, TX (US); Frank B. Stamps, Colleyville, TX (US); Ronald J. Measom, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 891 days.

(21) Appl. No.: 13/578,975

(22) PCT Filed: Nov. 12, 2010

(86) PCT No.: PCT/US2010/056491
§ 371 (c)(1),
(2), (4) Date: Aug. 14, 2012

(87) PCT Pub. No.: WO2012/064335
PCT Pub. Date: May 18, 2012

(65) Prior Publication Data
US 2012/0301299 A1    Nov. 29, 2012

(51) Int. Cl.
*B64C 27/473* (2006.01)
*B64C 27/00* (2006.01)
*B29C 70/30* (2006.01)
*B29L 31/08* (2006.01)

(52) U.S. Cl.
CPC .......... *B64C 27/473* (2013.01); *B64C 27/008* (2013.01); *B29C 70/30* (2013.01); *B29L 2031/085* (2013.01); *B64C 2027/4736* (2013.01); *Y02E 10/721* (2013.01); *Y02P 70/523* (2015.11); *Y10T 428/24992* (2015.01)

(58) Field of Classification Search
CPC .................... B64C 27/008; B64C 2027/4736; B64C 27/473; B29L 2031/085; B29C 70/30
USPC .................................................. 416/144, 145
See application file for complete search history.

(56) References Cited

U.S. PATENT DOCUMENTS

| 2,630,868 A | 3/1953 | Ellenberger |
| 3,713,753 A * | 1/1973 | Brunsch ........................ 416/226 |
| 4,078,422 A | 3/1978 | Brunsch |

(Continued)

FOREIGN PATENT DOCUMENTS

| EP | 2098496 A2 | 9/2009 |
| GB | 2041159 A | 9/1980 |

OTHER PUBLICATIONS

Extended European Search Report in related European patent application No. 10859595, mailed Jun. 28, 2013, 5 pages.

(Continued)

*Primary Examiner* — Dwayne J White
*Assistant Examiner* — Aaron R Eastman
(74) *Attorney, Agent, or Firm* — James E. Walton

(57) ABSTRACT

A rotor blade for an aircraft includes a composite portion having fiber-reinforced resin material, the composite portion having an outside surface that forms at least a partial airfoil shape. The weighted portion includes a plurality of weighted material layers and a plurality of fiber-reinforced resin material layers. Weighted material is configured to be compatible with and integrated into composite manufacturing processes used to fabricate the rotor blade. The weighted portion has a higher density than the composite portion and positioned to produce desired mass balance characteristics of the rotor blade.

19 Claims, 4 Drawing Sheets

(56) References Cited

U.S. PATENT DOCUMENTS

| | | | | |
|---|---|---|---|---|
| 4,316,700 | A * | 2/1982 | Schramm | 416/226 |
| 4,500,589 | A * | 2/1985 | Schijve et al. | 428/213 |
| 4,601,639 | A * | 7/1986 | Yen et al. | 416/230 |
| 4,892,462 | A | 1/1990 | Barbier et al. | |
| 4,895,551 | A * | 1/1990 | Fritz | 464/180 |
| 4,935,277 | A | 6/1990 | Le Balc'h | |
| 4,990,205 | A | 2/1991 | Barbier et al. | |
| 5,454,403 | A * | 10/1995 | Kerr et al. | 139/35 |
| 5,462,409 | A * | 10/1995 | Frengley et al. | 416/144 |
| 5,659,930 | A * | 8/1997 | Okawa | A44B 18/0023 24/445 |
| 5,939,007 | A | 8/1999 | Iszczyszyn et al. | |
| 7,364,407 | B2 * | 4/2008 | Grabau et al. | 416/229 R |
| 2009/0226746 | A1 * | 9/2009 | Chakrabarti et al. | 428/469 |
| 2010/0162565 | A1 * | 7/2010 | Mukherji et al. | 29/889.1 |
| 2010/0224310 | A1 | 9/2010 | Jones | |
| 2011/0002785 | A1 * | 1/2011 | Cawthorne et al. | 416/144 |

OTHER PUBLICATIONS

Office Action dated Nov. 20, 2014 from counterpart CA App. No. 2,816,509.

Office Action dated Feb. 17, 2015 from counterpart CN App. No. 201080070009.X.

* cited by examiner

COMPOSITE ROTOR BLADE HAVING WEIGHTED MATERIAL FOR MASS BALANCING

TECHNICAL FIELD

The present application relates to rotor blades. In particular, the present application relates to weighted material for mass balancing of composite rotor blades, the weighted material being configured to be compatible with and integrated into composite manufacturing processes.

DESCRIPTION OF THE PRIOR ART

A typical rotor blade relies upon one or more solid metal weights, strategically located in the structure, for mass balancing of the rotor blade. Typically, the solid metal weights are cast or machined out of a dense material such as lead or tungsten. The geometry of rotor blades typically include multiple complex contours, thus resulting in a metal weight that may require a significant amount of labor hours to manufacture. For example, a change to the geometry of a cast metal weight requires a substantial amount of time due to the manufacturing of a new mold. The solid metal weights are permanently located in the rotor blade during assembly in order to produce desired dynamics during operation. For example, a rotor blade may have a solid metal weight located toward the blade tip to increase the ability of the rotorcraft auto-rotate during engine failure. Additionally, the solid metal weight would typically be located along a leading edge portion of the rotor blade so as to produce desirable flight dynamics.

Considerable shortcomings exist in using a solid metal weight for rotor blade mass balancing. For example, if it is discovered that changes to the mass balance of the rotor blade are desired, then it takes a considerable amount of time to have a replacement casting tool redesigned and fabricated in order to produce a revised solid metal weight. Furthermore, in order to manufacture a rotor blade of considerable size, the solid metal weight must also be very large. For example, a solid metal weight of approximately 100 pounds could be required. A 100 pound solid metal weight would likely be beyond the carrying capacity allowed for a human worker, thus the solid metal weight would need to be mechanically hoisted into position during the rotor blade assembly process. Another shortcoming of the solid metal weight is the design challenge of capturing the metal weight in the rotor blade so as to insure the metal weight does not become dislodged during operation of the rotor blade, possibly causing catastrophic damage to the aircraft.

Although the developments in mass balancing of rotor blades have produced significant improvements, considerable shortcomings remain.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
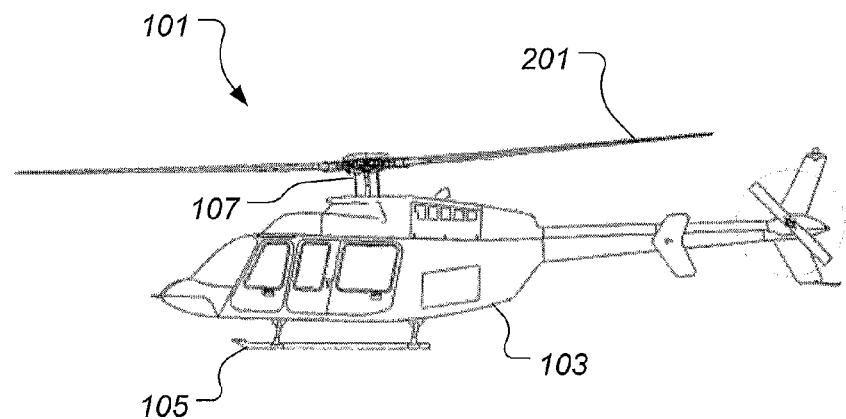
FIG. 1 is a side view of a rotorcraft having a rotor blade according to the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIG. 1, aircraft 101 includes a fuselage 103 and a landing gear 105. A rotor system 107 is configured to receive cyclic and collective control inputs thus enabling aircraft 101 to make controlled movements. For example, a collective control input changes the pitch of each rotor blade 201 collectively. In contrast, a cyclic control inputs selectively changes the pitch of individual rotor blades according to a rotation position. For example, as rotor blades 201 rotate, a cyclic input can increase the lift on one side of aircraft 101 and decrease on the other side of the aircraft 101, thus producing a lift differential. In this manner, cyclic control inputs can be made to control the pitch and roll of aircraft 101, as well as to produce various tilting maneuvers. It should be appreciated rotor blades 201 may be used on a variety of aircraft, including tiltrotors, quad tiltrotors, airplanes, and gyrocopters, to name a few.

Figure 2:
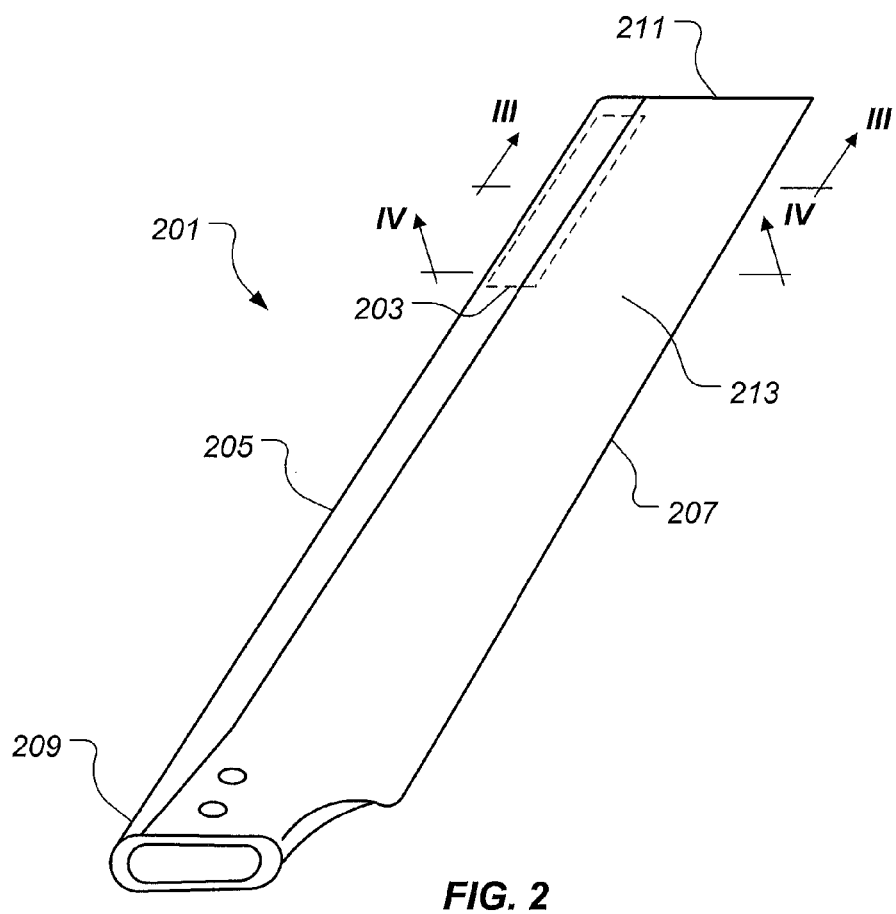
FIG. 2 is a perspective view of the rotor blade of FIG. 1.

Referring to FIG. 2, rotor blade 201 is illustrated in further detail. A weighted portion 203 is schematically shown as proximate to leading edge 205 and tip 211. It should be appreciated that one or more weight portions 203 may be located in a variety of locations within rotor blade 201. For example, weighted portion 203 may be located approximately mid-span between tip 211 and root 209. Furthermore, weighted portion 203 may be a continuous portion along leading edge 203 from near tip 211 to near root 209, the weighted portion 203 having varying degrees of density in accordance with inertial requirements. Weighted portion 203 has a higher density than composite portion 217 so that a center of gravity of the rotor blade 201 is skewed toward the location of weighted portion 203.

Figure 3:
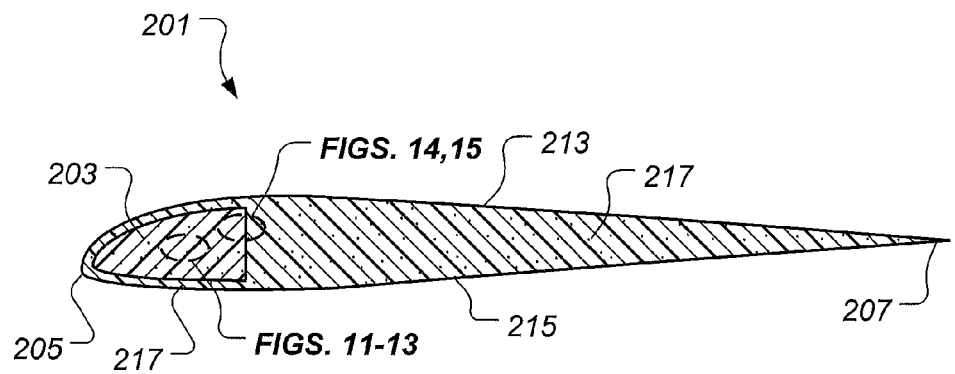
FIG. 3 is a stylized, cross sectional view of a selected portion of the rotor blade, taken along the section lines III-III shown in FIG. 2.
Figure 4:
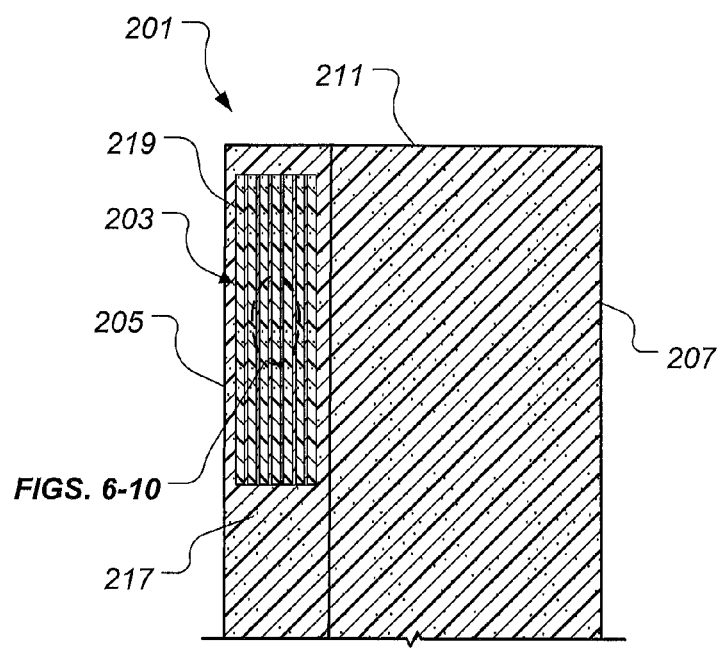
FIG. 4 is a stylized, cross sectional view of a selected portion of the rotor blade, taken along the section lines IV-IV, shown in FIG. 2.

Referring now also to FIGS. 3 and 4, which are a cross-sectional views of rotor blade 201. Leading edge 205 defines a forward contour of rotor blade 201. Upper skin 213 and lower skin 215 define the upper and lower contours of rotor blades. Upper skin 213 and lower skin 215 preferably comprise a fiber-reinforced, resin composite material, such as a carbon fiber-reinforced epoxy material. Trailing edge 207 represents the trailing portion where upper skin 213 and lower skin 215 come together. It should be appreciated that rotor blade 201 may have a variety of airfoil shapes, including articulated members such as moveable flaps, and the like.

Figure 5:
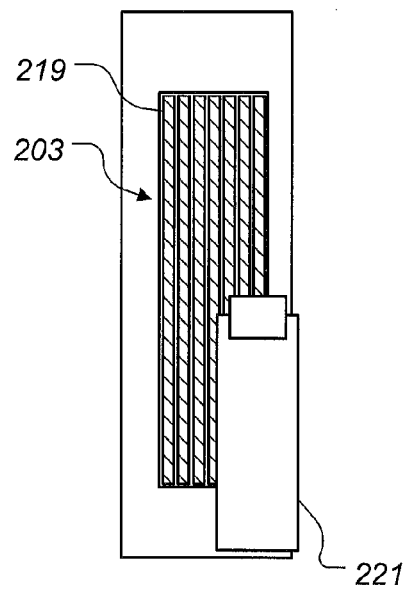
FIG. 5 is a stylized view of a fiber placement machine laying weighted material in a weighted portion of the rotor blade from FIG. 2.

Rotor blade 201 includes a composite portion 217 and weighted portion 203. Composite portion 217 preferably comprises a fiber/resin composite material, such as fiberglass/epoxy material, but other forms of fiber/resin composite material may be used. Rotor blade 201 may include internal structural components, such as spars and ribs, in addition to composite portion 217. Furthermore, honeycomb core may be used as a lightweight stiffening member in certain areas within composite portion 217 of rotor blade 201. Even further, composite portion 217 may include hollow portions or closed-cell foam material to keep certain portions of rotor blade 201 as light and stiff as possible. During fabrication of composite portion 217, a fiber placement machine 221 (shown in FIG. 5) is preferably used to lay pre-impregnated narrow strips of uncured fiberglass/epoxy, also known as "pre-preg." Alternatively, a human may lay the pre-preg strips in a predefined pattern, also known as "hand lay-up", which is a manual process. The pre-preg strips may be laid in various orientations. The pre-preg strips may be of a uni-directional pattern, where the fibers have the same orientation, as well as woven patterns, such that the fibers are woven together forming a multi-directional pattern.

Figure 11:
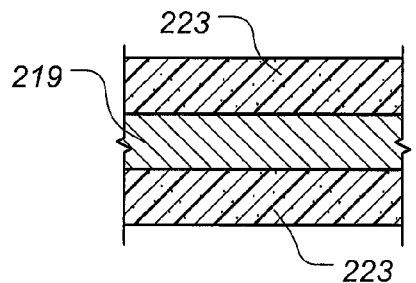
FIGS. 11-13 are stylized, detail views of a selected portion of the rotor blade, taken from FIG. 3.
Figure 12:
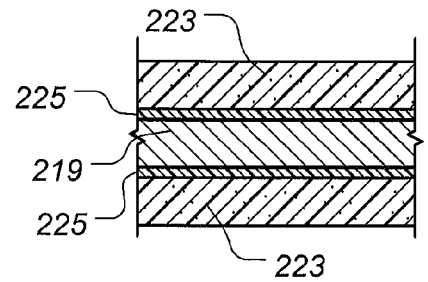

Weighted portion 203 includes weighted material 219 which includes dense material for substantially adding weight to weighted portion 203. Weighted material 219 is configured to be compatible with and integrated into composite manufacturing processes. For example, a fiber placement machine 221 (shown in FIG. 5) is preferably used to lay-up composite portion 217 as well as weighted portion 215. In the preferred embodiment, weighted material 219 comprises a dense metal, such as lead, but other dense materials, such as tungsten may be used. In the preferred embodiment, weighted material 219 comprises thin strips of lead, as depicted in FIG. 4. Weighted portion 203 also includes layers of fiber/resin composite material 223, such as fiberglass/epoxy material, such that weighted material 219 is sandwiched between layers of the fiber/resin composite material 223, as shown in FIG. 11. In an alternative embodiment, a layer of adhesive 225 is used between each layer of stand material 219 and fiber/resin composite material 223, as shown in FIG. 12. In the preferred embodiment, the thin strips of dense material are of similar thickness to that of the fiber/resin composite material 223. For example, if each layer of the fiber/resin composite material 223 is 0.015 inches thick, then the thin strips of dense material are preferably 0.015 inches thick.

The mass balance of rotor blade 201 may be easily changed by changing the size, location, and density of weighted portion 203. For example, if testing of rotor blade 201 determines that weighted portion 203 needs to be three pounds heavier, then the size of weighted portion 203 can be increased by reprogramming the lay-up procedure so that weighted portion 203 increases in size so as to add three pounds. Alternatively, weighted portion 203 can simply be layed-up using denser weighted material 219 so that the weight of weighted portion is increased by three pounds. In addition, weighted portion 203 can be made heavier by increasing the amount of weighted material 219 used in weighted portion 203. Such changes can be made quickly and accurately. Furthermore, fine tuning of the mass balance of rotor blade 201 is now possible by making small changes to the lay-up configuration of weighted portion 203.

Figure 6:
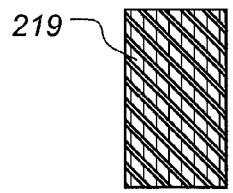
FIGS. 6-10 are stylized, detail views of a selected portion of the weighted portion, taken from FIG. 4.

Referring now to FIGS. 6-10, alternative embodiments of weighted material 219 are illustrated. FIG. 6 depicts one particular configuration in which weighted material 219 includes thin strips of lead, each strip positioned at a 45 degree angle. It should be appreciated that the thin strips of lead may be positioned at any angle.

Figure 7:
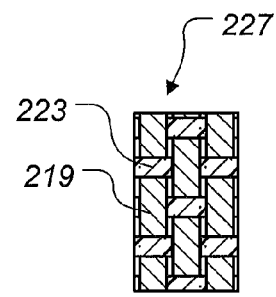
Figure 8:
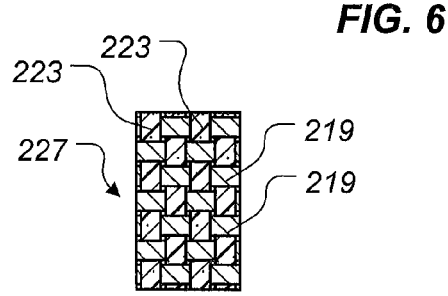
Figure 13:
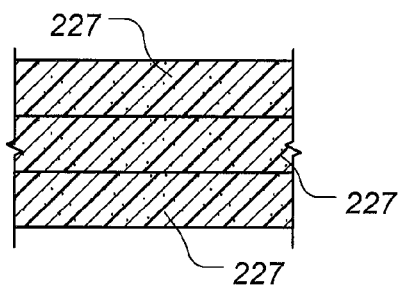

FIGS. 7 and 8 depict embodiments in which weighted material 219 and fiber/resin composite material 223 are woven together to form a weighted weave 227. Weighted weave 227 is depicted with the strips of weighted material 219 being wider than fiber/resin composite material 223; however it should be appreciated that the strips of varying widths may be used. For example, FIG. 8 depicts an embodiment in which weave 227 has approximately equal width strips of weighted material 219 and fiber/resin composite material 223 strips. When layers of weighted weaves 227 are used to form weighted portion 203, layers of pure fiber/resin composite material 223 are unnecessary. In other words, in such an embodiment, weighted portion 203 includes layers of weighted weave 227 layed up directly on top of each other. In such an embodiment, adjacent layers of weighted weave 227 form cross-linking of the fibers in the strips of fiber/resin composite material 223 located on top of each other. In such an embodiment, the fiber/resin composite material 223 in each weave 227 acts to provide structural continuity, while also trapping the strips of weighted material 219. It should be appreciated that layers of adhesive 225 may be used between each layer of weighted weave 227. FIG. 13 depicts layers of weighted weave 227 layed-up directed on top of each other. Alternatively, a layer of adhesive may be used between each layer of weighted weave 227.

Figure 9:
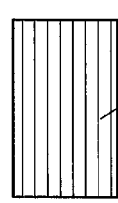

FIG. 9 depicts weighted material 219 as tows 229 that are alternatively used in lieu of actual weighted strips. Each 229 tow is configured to be a plurality of fiber-like strands of a dense material, such as lead. Even though FIG. 9 depicts each tow 229 positioned axially along a length of rotor blade 201, it should be appreciated that each tow 229 may be positioned in any desired angle.

Figure 10:
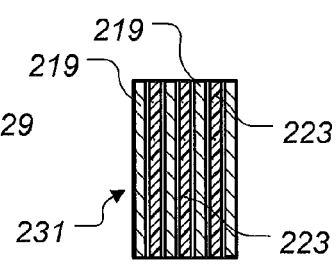

FIG. 10 depicts a layer within weighted portion 203 as including alternating strips of weighted material 219 and fiber/resin composite material 223 to form a single hybrid layer 231. In other words, each individual hybrid layer 231 includes strips of weighted material 219 and strips of fiber/resin composite material 223, as shown in FIG. 10. In such an embodiment, hybrid layers 231 are layed up directly on top of each other to form weighted portion 203. Even though FIG. 10 depicts strips of weighted material 219 and strips of fiber/resin composite material 223 being positioned axially along the length of rotor blade 201, it should be appreciated that strips of weighted material 219 and strips of fiber/resin composite material 223 may be positioned at 45 degree angles. When the strips 219 and 223 are positioned at an angle to form a hybrid layer 231, then an adjacent layer 231 is preferably positioned at an opposite angle to generate cross-linking of the fibers between strips of fiber/resin composite material 223 located on top of each other. In such an embodiment, the fiber/resin composite material 223 acts to provide structural continuity, while also trapping the strips of weighted material 219. It should be appreciated that layers of adhesive 225 may be used between each layer of hybrid layer 231.

In an alternative embodiment, weighted material 219 may be a dense metal powder, such as lead powder, mixed in with fiber/resin composite material. For example, the lead powder may be mixed in with the resin, or it may be blown onto the fibers themselves. In another alternative embodiment, weighted material 219 may be composite fibers that are coated in dense metal through a dipped or coating process.

Figure 14:
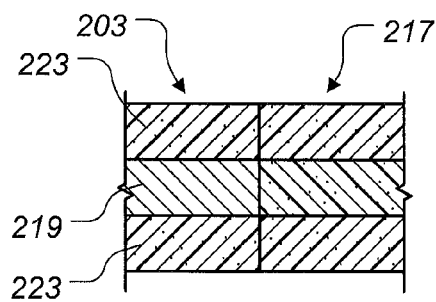
FIGS. 14 and 15 are detail views of a selected portion of the rotor blade, taken from FIG. 3.
Figure 15:
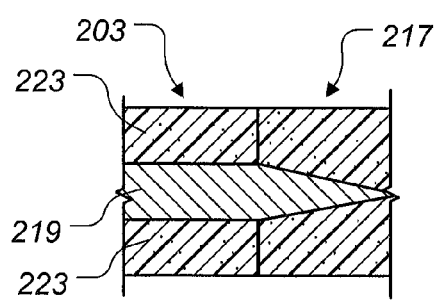

Referring now to FIGS. 14 and 15, an area of demarcation between weighted portion 203 and composite portion 217 is illustrated. FIG. 14 illustrates an embodiment in which weighted portion 203 and composite portion 217 abut up next to each other. FIG. 15 illustrates an embodiment in which weighted portion 203 and composite portion 217 abut up next to each other. FIG. 15 illustrates an embodiment in which weighted portion 203 and composite portion 217 are at least partially finger jointed together. For example, as shown in FIG. 15, weighted material 219 extends into composite portion 217. Finger jointing weighted portion 203 and composite portion 217 may result in better entrapment of each layer of weighted material 219.

It should be appreciated that a variety of composite members, in addition to rotor blades, may implement a weighted portion according to the system of the present application. For example, any composite part that requires a dense portion or a particular center of gravity may use a manufacturing process similar to the manufacturing process disclosed herein with regard to rotor blade 201.

The system of the present application provides significant advantages, including: (1) provides a weighted portion within a rotor blade that can be easily and quickly modified; (2) the weighted portion with the rotor blade is more securely captured due to the fiber/resin composite material in and around the weighted portion; (3) the weighted portion is able to provide structural continuity with surrounding composite portions by the fiber/resin composite structure within the weighted portion; (4) the weighted portion may be layed-up by an automated or manual composite lay-up technique; (5) reduces part count of the rotor blade; (6) allows for fine tuning during mass balancing procedures; and (7) prevents the need for a casting tool for a conventional rotor blade weight.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A rotor blade for an aircraft, the rotor blade comprising:
    a composite portion having fiber-reinforced resin material, the composite portion having an outside surface that forms at least a partial airfoil shape;
    a weighted portion comprising:
        a plurality of weighted material layers;
        a plurality of fiber-reinforced resin material layers;
    wherein the each weighted material layer is adjacent with at least one fiber-reinforced resin material layer;
    wherein the each weighted material layer is cross-linked with the adjacent fiber-reinforced resin material layer thereby retaining the each weighted material layer;
    wherein a thickness of each of the plurality of composite layers is equal to a thickness of each of the plurality of weighted layers; and
    wherein the weighted portion has a higher density than the composite portion.

2. The rotor blade according to claim 1, wherein the weighted portion is located near a leading edge portion of the rotor blade.

3. The rotor blade according to claim 1, wherein each layer of weighted material is a thin strip of metal.

4. The rotor blade according to claim 3, wherein the metal is lead.

5. The rotor blade according to claim 3, wherein the metal is tungsten.

6. The rotor blade according to claim 1, wherein each weighted material layer comprises:
    a plurality of strips of dense metal woven together with a plurality of strips of fiber composite material.

7. The rotor blade according to claim 6, wherein the plurality of strips of dense metal woven together are wider than the plurality of strips of fiber composite material.

8. The rotor blade according to claim 1, wherein each weighted material layer comprises:
    a plurality of strands of dense metal.

9. The rotor blade according to claim 1, the weighted portion further comprising:
    an adhesive layer located between each weighted material layer and each fiber-reinforced resin material layer.

10. The rotor blade according to claim 1, wherein the composite portion and the weighted portion are at least partially dovetailed together at an area of abutment.

11. A composite member comprising:
    a composite portion having fiber-reinforced resin material;

a weighted portion located within the composite portion, the weighted portion having a higher density than the composite portion so that a center of gravity of the composite member is skewed toward the location of the weighted portion, the weighted portion comprising:
a plurality of composite layers; and
a plurality of weighted layers, wherein each weighted layer and composite layer are located in alternating form;
wherein the each weighted layer is cross-linked with the adjacent composite layer; and
wherein a thickness of each of the plurality of composite layers is equal to a thickness of each of the plurality of weighted layers.

12. The composite member according to claim 11, each weighted layer comprising:
a weighted weave including a fiber composite material woven together with a plurality of strips of a dense metal.

13. The composite member according to claim 11, each weighted layer comprising:
a weighted weave including a fiber composite material woven together with a plurality of strands of dense metal; and
wherein the strands of dense metal are captured by being woven together with the fiber composite material.

14. The composite member according to claim 11, the weighted portion further comprising:
a dense metal powder integrated with the composite layers.

15. A method of making a weighted portion of a rotor blade, comprising:
laying up alternating layers of weighted material and layers of fiber/resin composite material;
cross-linking each layer of weighted material with the adjacent layer of composite material;
trapping the weighted material between the layers of composite material; and
applying heat so as to cure the weighted portion;
wherein a thickness of each of the layers of weighted material is equal to a thickness of each of the layers of fiber/resin composite material.

16. The method according to claim 15, wherein the laying up alternating layers of weighted material and layers of fiber/resin composite material is accomplished, at least in part, by an automated fiber placement process.

17. The method according to claim 15, wherein the laying up alternating layers of weighted material and layers of fiber/resin composite material is accomplished, at least in part, by a manual fiber placement process.

18. The method according to claim 15, wherein the laying up of weighted material is accomplished by a manual fiber placement process, while the laying up of layers of fiber/resin composite material is accomplished by an automated fiber placement process.

19. The method according to claim 15, wherein the weighted material includes thin strips of a dense metal.

* * * * *